US005784614A

United States Patent [19]
Davis

[11] Patent Number: 5,784,614
[45] Date of Patent: Jul. 21, 1998

[54] CACHE AFFINITY SCHEDULING METHOD FOR MULTI-PROCESSOR NODES IN A SPLIT TRANSACTION BUS ARCHITECTURE

[75] Inventor: Todd C. Davis, Blythewood, S.C.

[73] Assignee: NCR Corporation, Dayton, Ohio

[21] Appl. No.: 841,183

[22] Filed: Apr. 28, 1997

Related U.S. Application Data

[63] Continuation of Ser. No. 508,017, Jul. 27, 1995, abandoned.

[51] Int. Cl.[6] ..................................................... G06F 15/16
[52] U.S. Cl. ............................. 395/672; 395/675; 711/120
[58] Field of Search ................................. 395/672, 673, 395/675; 711/118, 120

[56] References Cited

U.S. PATENT DOCUMENTS

| | | | |
|---|---|---|---|
| 4,015,243 | 3/1977 | Kurpanek et al. | 395/287 |
| 4,527,238 | 7/1985 | Ryan et al. | 364/200 |
| 5,109,512 | 4/1992 | Bahr et al. | 395/650 |
| 5,123,094 | 6/1992 | MacDougall | 395/375 |
| 5,185,861 | 2/1993 | Valencia | 395/200 |
| 5,237,673 | 8/1993 | Orbits et al. | 395/425 |
| 5,257,375 | 10/1993 | Clark et al. | 395/650 |
| 5,261,053 | 11/1993 | Valencia | 395/200 |
| 5,269,013 | 12/1993 | Abramson et al. | 395/425 |
| 5,287,508 | 2/1994 | Hejna, Jr. et al. | 395/650 |
| 5,317,738 | 5/1994 | Cochcroft, Jr. et al. | 395/650 |
| 5,325,526 | 6/1994 | Cameron et al. | 395/650 |
| 5,349,656 | 9/1994 | Kaneko et al. | 395/650 |
| 5,359,715 | 10/1994 | Heil et al. | 395/325 |
| 5,379,428 | 1/1995 | Belo | 395/650 |
| 5,450,590 | 9/1995 | Elko et al. | 395/700 |
| 5,485,626 | 1/1996 | Lawlor et al. | 395/650 |

OTHER PUBLICATIONS

Squillante et al, Using Processor–Cache Affinity Information in Shared–Memory Multiprocessor Scheduling. IEEE Trans. on Parallel and Distributed Sys., Feb. 1993 V9 Issue 2.

Using Processor–Cache Affinity Information in Shared–Memory, Squillante and Lazowska, IEEE Transactions on Parallel and Distributed Systems, vol. 4, No. 2, Feb. 1993.

*Primary Examiner*—Lucien U. Toplu
*Attorney, Agent, or Firm*—Paul W. Martin

[57] ABSTRACT

A method of selecting a process to run within a multi-processor computer system in which the processors are arranged in nodes defined by node buses. A global run queue for queuing unaffined processes of the computer system is provided. A nodal run queue for each node bus of the computer system is provided. Highest priority levels in the global run queue is determined by one of the processors. Highest priority levels in the nodal run queue of the one processor is determined by the one processor. A process having a highest priority within the highest priority levels of the global and nodal run queues is determined by the processor. Finally, the process is executed by the one processor. Only when the processor finishes searching the global run queue and its nodal run queue for a process to run and does not find one, does it search within other nodal run queues that are found to be busy.

4 Claims, 3 Drawing Sheets

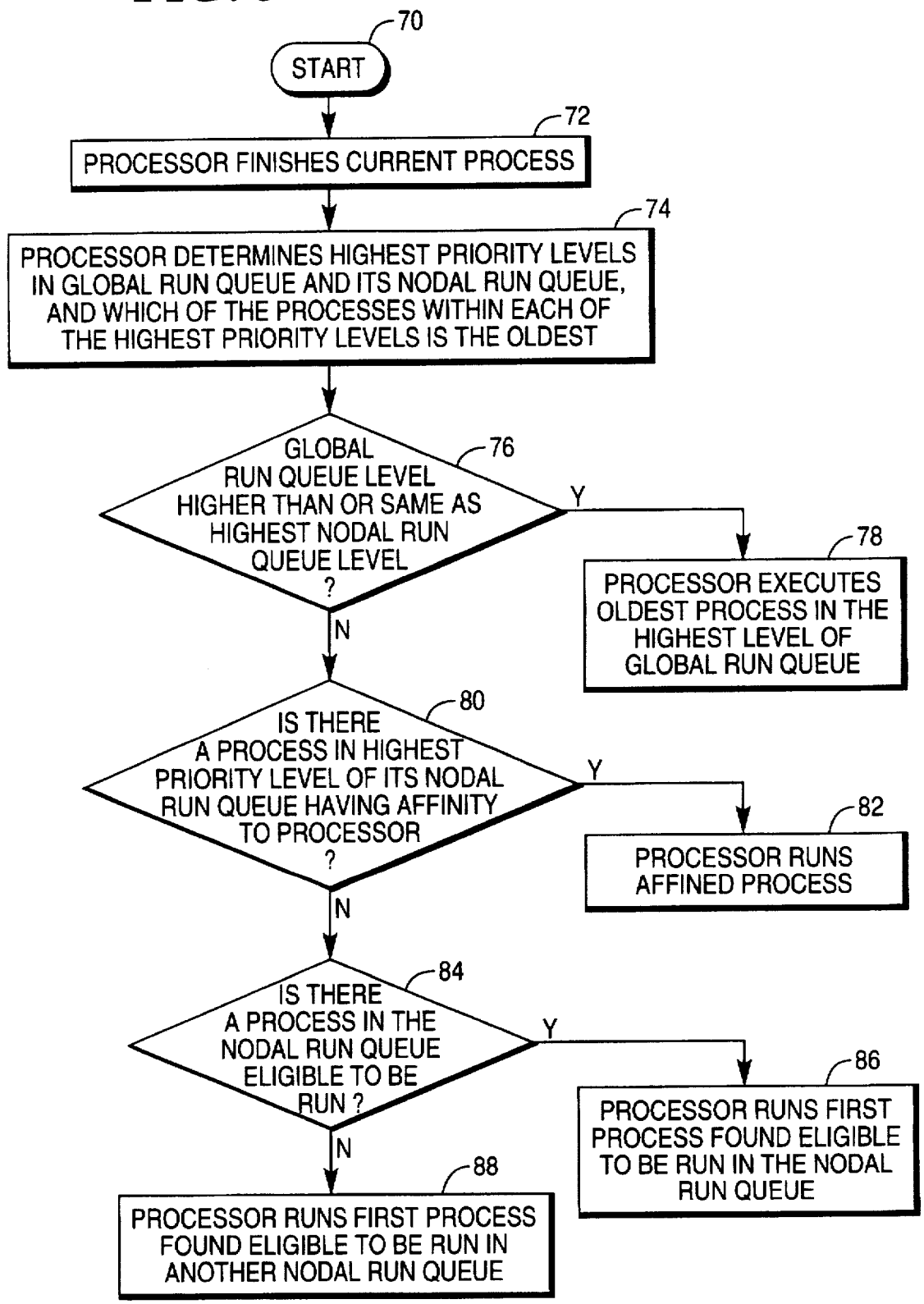

CACHE AFFINITY SCHEDULING METHOD FOR MULTI-PROCESSOR NODES IN A SPLIT TRANSACTION BUS ARCHITECTURE

This is a continuation of application Ser. No. 08/508,017 filed on Jul. 27, 1995, now abandoned.

BACKGROUND OF THE INVENTION

The present invention relates to methods of managing cache memories in multi-processor computer systems, and more specifically to a cache affinity scheduling method for multi-processor nodes in a split transaction bus architecture.

Processes in multi-processor computer systems are scheduled among the processors to achieve a performance gain over single-processor computer systems. The scheduling a process to a run queue of a processor establishes an affinity of the process to the processor.

Previous methods of establishing affinity generally attempt to schedule processes on the same processor on which they were scheduled most recently. One such method of scheduling processes is disclosed in U.S. Pat. No. 5,185,861 to Valencia, issued Feb. 9, 1993, and entitled "Cache Affinity Scheduler". In that patent, an affinity scheduler for a multi-processor computer system is disclosed. The affinity scheduler allocates processors to processes and schedules the processes to run based upon the bases of priority and processor availability. The scheduler uses the estimated amount of cache context to decide which run queue a process is to be enqueued. This patent is hereby incorporated by reference.

In a hierarchical bus system, processors are arranged in groups called nodes. If the system has a split transaction bus, the bus interface controller must maintain cache coherency. A coherency problem can exist if multiple processors on a node bus attempt to access the same address at the same time.

Therefore, it would be desirable to provide a cache affinity scheduler for a multi-processor computer system having an architecture containing groups of processors organized into nodes.

SUMMARY OF THE INVENTION

In accordance with the teachings of the present invention, a cache affinity scheduling method for multi-processor nodes in a split transaction bus architecture is provided.

The method includes the steps of providing a global run queue for queuing unaffined processes of the computer system, providing a nodal run queue for each node bus of the computer system, determining the highest priority levels in the global run queue by one of the processors in one of the nodes, determining the highest priority levels in the nodal run queue by the one processor, determining a process having a highest priority within the highest priority levels of the global and nodal run queues by the processor, and executing the process by the one processor.

Processor 16a runs processes in the following priorities, starting with (1) as the highest priority:

1. Process priority: The highest priority process be run before other processes.
2. Process age on the run queue: The oldest process in the global run queue of a given priority is run over a process on a nodal run queue having a same or lower priority.
3. Processor affinity: A process within the highest priority level of the nodal run queue that has an affinity to a processor runs over unaffined processes within that level. If none are found, the first process found eligible to run by the processor in the nodal run queue is selected.
4. Nodal affinity: A process within the nodal run queue runs over a process within other nodal run queues. Only when the processor finishes searching the global run queue and its nodal run queue for a process to run and does not find one, does it search within other nodal run queues that are found to be busy.

It is accordingly an object of the present invention to provide a cache affinity scheduling method for multi-processor nodes in a split transaction bus architecture.

It is another object of the present invention to provide a method of selecting a process to run within a multi-processor computer system having groups of processors arranged in nodes defined by node buses, in which higher priority processes are located in the a global run queue and in a nodal run queue associated with a processor desirous of running the processes.

It is another object of the present invention to provide a method of selecting a process to run within a multi-processor computer system having groups of processors arranged in nodes defined by node buses, in which lowest priority processes are located in global run queues not associated with a processor desirous of running the processes.

BRIEF DESCRIPTION OF THE DRAWING

Additional benefits and advantages of the present invention will become apparent to those skilled in the art to which this invention relates from the subsequent description of the preferred embodiments and the appended claims, taken in conjunction with the accompanying drawings, in which:

FIG. 3 is a flow diagram illustrating the method of the present invention.

DETAILED DESCRIPTION OF THE PREFERRED EMBODIMENT

Figure 1:
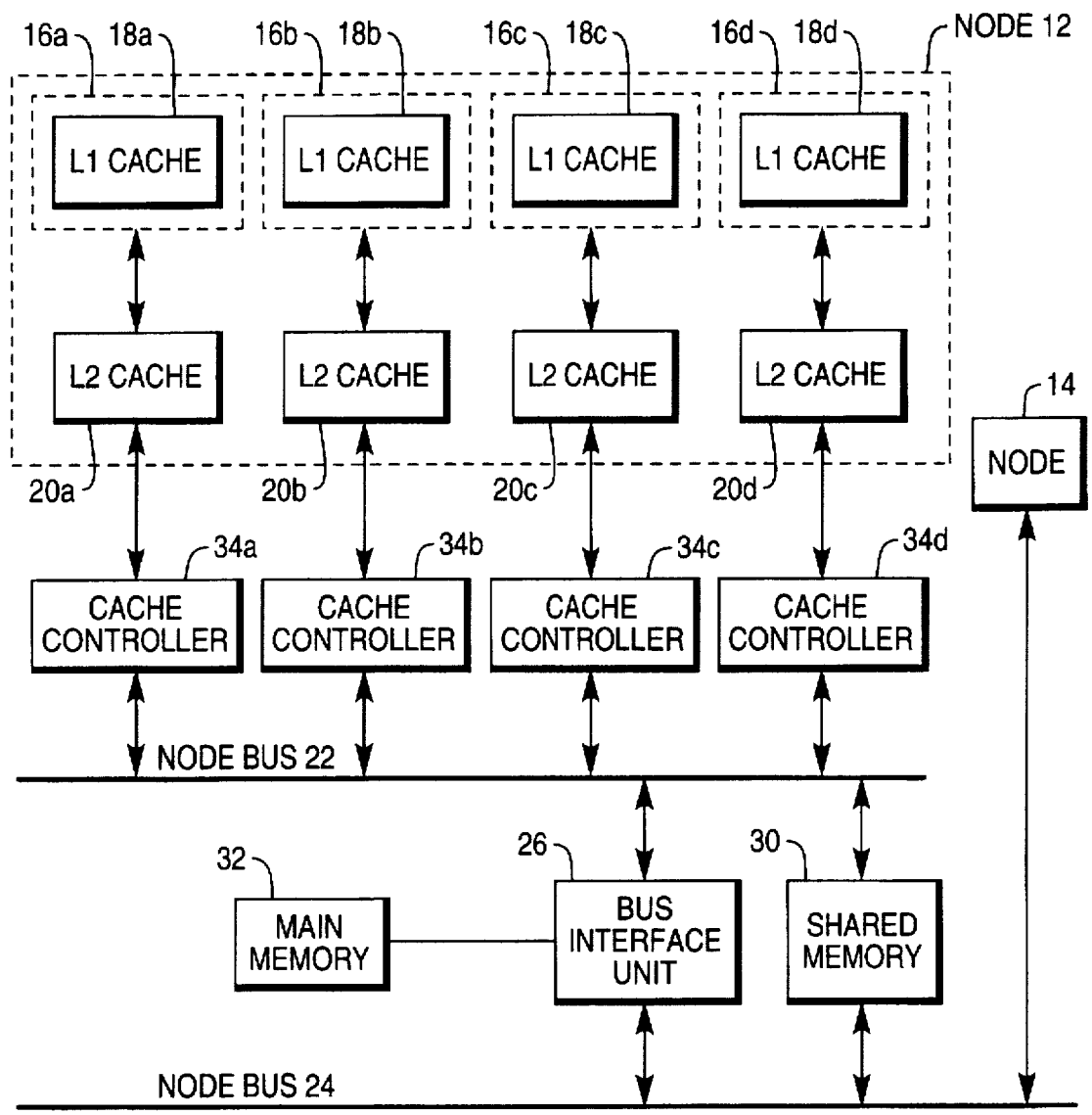
FIG. 1 is a block diagram of a multi-processor computer architecture in which the processors are organized into nodes.

Referring now to FIG. 1, a multi-processor system architecture 10 includes computing node 12 and computing node 14. System 10 may include additional nodes. Each node preferably includes four processors 16a–d, four level-one caches (L1) 18a–d, and four level two (L2) caches 20a–d. Each node includes a node bus. Here, node buses 22 and 24 are shown.

Each of processors 16a–d may include its own level-one cache 18a–d. For example, when each node contains four identical Intel Pentium processors, level-one caches 18a–d are internal to that processor and level-two caches 20a–d are located externally on the system board.

Level-one and level-two caches 18a–d and 20a–d all follow the "inclusion" principle, which states that any higher cache level entry is a subset of the lower level caches, where the level-one caches 18a–are the highest level caches.

Node buses 22 and 24 form a split-transaction bus having a bus interface unit 26 between them. Bus interface unit also couples node buses 22 and 24 to system bus 28. The use of node buses 22 and 24 facilitates fast direct transfers of data between level-two caches 20a–d, without having to move data through shared memory 30 and main memory 32.

System 10 includes interleaved memory 30 shared between node buses 22 and 24. Thus, node buses 22 and 24 provide processors 16a–d with direct access to memory for executing code and storing data, and may be thought of as a third level cache memory.

System bus 28 forms an input-output (I/O) or expansion bus. Main memory 32 couples to system bus 28.

Cache controllers 34a–d implement a caching protocol, such as the Modified-Exclusive-Shared-Invalid (MESI) cache coherency protocol, which is hereby incorporated by reference. The MESI protocol allows each line of data in a cache to have an associated field which indicates whether the line of data is MODIFIED, EXCLUSIVE, SHARED, or INVALID as defined below:

MODIFIED—This state indicates a line of data which is exclusively available in only this cache, and is modified (main memory's copy is state or the most recent copy). Modified data has been acted upon by a processor. A Modified line can be updated locally in the cache without acquiring the shared memory bus.

EXCLUSIVE—This state indicates a line of data which is exclusively available in only this cache, and that this line is not Modified (main memory also has a valid copy). Exclusive data can not be used by any other processor until it is acted upon in some manner. Writing to an Exclusive line causes it to change to the Modified state and can be done without informing other caches, so no memory bus activity is generated. The Exclusive state is of limited use in a copyback cache that allocates on "writes". The Exclusive state is generally bypassed because the entry goes directly to the Modified state.

SHARED—This state indicates a line of data which is potentially shared with other caches (the same line may exist in one or more caches). Shared data may be shared among multiple processors and stored in multiple caches. A Shared line can be read by the CPU without a main memory access. Writing to a Shared line causes a write-through cycle.

INVALID—This state indicates a line of data is not available in the cache. Invalid data in a particular cache is not to be used for future processing, except diagnostic or similar uses. A read to this line will be a "miss" (not available). A write to this line will cause a write-through cycle to the memory bus.

Figure 2:
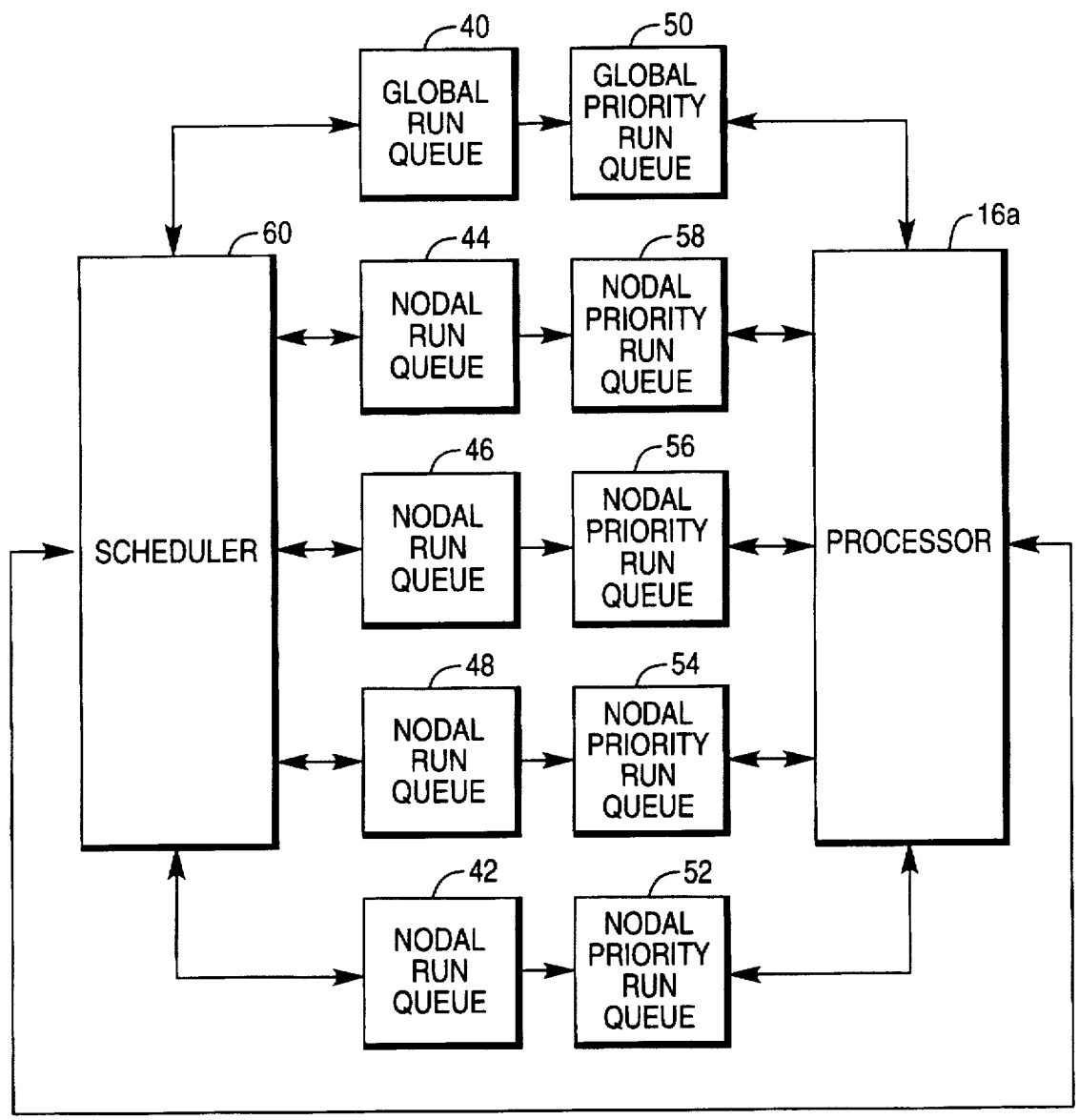
FIG. 2 is a block diagram illustrating the global and nodal run queues used by the method of the present invention.

Turning now to FIG. 2, system 10 includes global run queue 40 and nodal run queues 42–48. Global run queue 40 stores processes that are not affined to any processor.

Nodal run queue 42 store processes that are affined to processors 16a–d, i.e., that have previously been run on processors 16a–d. Nodal run queues 44–48 store processes that are affined to twelve other processors in a four-node/four-node bus system.

System 10 also includes global priority run queue 50 and nodal priority run queues 52–58. These run queues are ordered by priority level and use a first-in-first-out (FIFO) priority queue to order processes within each priority level. In this example, these priority queues are established by the UNIX operating system.

Scheduler 60 schedules runnable processes in global run queue 40 and nodal run queues 42–48. Scheduler 60 places processes that are not affined to any processor in global run queue 40 in and stores processes that are affined to processors in nodal run queues 42–48. Thus, a process which is affined to processor 16a would be stored in nodal run queue 42 by scheduler 60.

Scheduler 60 also and alerts processors 16a–d when affined processes are placed on nodal run queue 42. When a process is placed on a nodal queue, only the processor to which the process has affinity is alerted. This gives the affined processor a chance to pick up the process and run it without allowing other idle processors within the node to race to pick up this newly runnable process.

Processor 16a searches nodal run queue 42 for a runnable process 1) when it is signaled by scheduler 60, 2) when it is in an idle state, and 3) when it finishes running a process.

Turning now to FIG. 3, the method of selecting a process to run by a processor begins with START 70. In general, the method of the present invention queues processes being made runnable on the nodal run queue of the node of the same processor on which they were scheduled most recently, since the data associated with the process is most likely still in the level-one or level-two cache memories of the processor. Nodal run queues 42–48 are used because of the cache line sharing that occurs between level-two cache memories on a node. A cache line that is available in another level-two cache memory in the node will be used to satisfy a memory request rather than having main memory 32 satisfy the request. Processor 16a is the example processor used here to illustrate the method.

In step 72, processor 16a finishes a current process.

In step 74, processor 16a determines the highest priority levels in global run queue 40 and its nodal run queue 42, and which of the processes within the highest priority levels are the oldest.

In step 76, processor 16a determines whether the highest priority level within global run queue 40 is higher than or the same as the highest priority level within nodal run queue 42.

It is important in the UNIX operating system that the highest priority process be run before other processes. The highest priority process of global run queue 40 and nodal run queue 42 is generally selected to run. A tunable priority delta is used to give some preference to nodal queue 42 over global queue 40. The lowest priority process of nodal queue 42 considered is the greatest of the minimum priority of nodal run queue 42 and the maximum priority of global queue 40 minus the priority delta:

$$MAX(minrunpri_n, maxrunpri_g - priority_d),$$

where $minrunpri_n$ is the minimum priority of nodal queue 42, $maxrunpri_g$ is maximum priority of global queue 40, and $priority_d$ is the tunable priority delta.

If so, processor 16a executes the oldest process in the highest level of global run queue 40 in step 78.

If the first process on global run queue 40 of a given priority has been on global run queue 40 for a defined period of time longer than another process of the same priority on nodal run queue 42, the process on global run queue 40 is considered to run over the process on nodal run queue 42.

If not, processor 16a determines whether there is an affined process in the highest priority level of its nodal run queue 42 in step 80.

If there is such a process, processor 16a runs the affined process in nodal run queue 42 in step 82.

If not, then processor 16a determines whether there is a process in nodal run queue 42 that is eligible to be run or runnable in step 84.

If there is an eligible process, processor 16a runs the first process found eligible to be run in step 86.

Once the processes of a given priority on nodal run queue 42 are considered, all the processes of that priority level on nodal run queue 42 are searched by processor 16a until a process that has affinity to processor 16a is found. If none are found, the first process found eligible to run by processor 16a in nodal run queue 42 is selected.

If there is no affined process or eligible process in nodal run queue 42, processor 16a runs the first process it finds eligible to be run in one of nodal run queues 44-48 in step 88.

When processor 16a finishes searching global run queue 40 and nodal run queue 42 for a process to run and does not find one, it searches other nodal queues 44-48 that are found to be busy. A nodal run queue is defined to be busy when the number of processes on the nodal run queue exceeds the tunable parameter StealNodeProcCount. Taking processes from another node to run is undesirable since cache lines would have to be transferred from one node to another. This is the worst possible case in the cache coherency scheme:

```
/*
 * Affinity related parameters
 */
struct affintune {
    ...
    clock_t dispqage;      /* process run queue age difference
before
                              selecting from dispq */
    int priorityD;         /* priority difference to select from
dispq */
    int StealNodeProcCount;  /* n_srunprocs of Node queue before
stealing */
    ...
};
```

Code sections associated with the method of the present invention are located in the following appendix.

APPENDIX

The affinity statistics:

```
/*
 * Affinity related parameters
 */
struct affinstate {
    ...
    int node_steals;  /* node migrations due to idle-
loop steals */
    ...
};
```

Per process data:

```
    clock_t p_ondispq;      /* time stamp when put on
dispq */
    struct dispq *p_dispq;  /* attached to this
dispatch queue */
```

Per processor data:

```
    cpuid_t       c_NodeId;        /* Affinity Node
Id */
    NodeInfo_t    *c_MyNodeInfo;   /* Node disp queue
data */
    AffinInfo_t   *c_MyAffinInfo;  /* cpu affinity
data */
```

Node data structures:

```
typedef struct NodeInfo {
    struct InfoNode {
        dispq_t *i_dispq;      /* array of disp queues indexed by
pri */
        int     i_srunprocs;   /* no. of procs on node dispq */
        int     i_maxrunpri;   /* priority of highest priority
active queue
*/
        int     i_minrunpri;   /* priority of lowest priority
active queue */
        int     i_TOid;        /* timeout ID's for affindecay()
*/
        ulong   *i_dqactmap;   /* bitmap to keep track of active
disp queues
*/
```

APPENDIX-continued

```
        simple_lock_t  i_bitmap_lock;  /*
dqactmap,maxrunpri,srunprocs lock */
    } InfoNode;
#define n_dispq           InfoNode.i_dispq
#define n_srunprocs       InfoNode.i_srunprocs
#define n_maxrunpri       InfoNode.i_maxrunpri
#define n_minrunpri       InfoNode.i_minrunpri
#define n_TOid            InfoNode.i_TOid
#define n_dqactmap        InfoNode.i_dqactmap
#define n_bitmap_lock     InfoNode.i_bitmap_lock
    unsigned char         CacheLineFill [32 - (sizeof(struct
InfoNode) % 32)];
} NodeInfo_t;
extern NodeInfo_t *NodeInfo;
extern cpuid_t nnode;      /* number of Nodes */
Code fragments used in the invention:

do
    lastrunpri = ni->n_minrunpri >= maxrunpri -
affintune.priorityD ?
             ni->n_minrunpri : maxrunpri -
affintune.priorityD ;
    while( lastrunpri < 0 );   /* in case maxrunpri goes
to -1 */
    ...
    for (runpri = ni->n_maxrunpri; runpri >= lastrunpri ; —
runpri) {
        dq = ni->n_dispq + runpri;
        if ((pp=dq->dq_first) == NULL)
            continue;
        if( runpri == maxrunpri &&
            (rp = (&dispq[runpri])->dq_first) != NULL &&
            rp->p_ondispq + affintune.dispqage < pp-
>p_ondispq )
            break;
        DISPQ_CHECK (3,0);
        if(DISPQ_TRYLOCK(dq) == L_FAIL)
            continue;
        nodeQchecked = 1;
        if( (pp = CheckDispQ(dq, runpri, ni)) != NULL ) {
            DISPQ_UNLOCK (dq);
            goto out;
        }
        DISPQ_UNLOCK (dq);
        DISPQ_CHECK(4,0);
    }
    if( ni->n_maxrunpri < 0 || nodeQchecked ) {
        /*
         * Clear the flag telling us to look at
         * the dispatch queue.
         */
        SETLASTDQGEN();
        locked_write(prior_disp_cnt,
locked_read(disp_cnt));
    }
    for (runpri = maxrunpri; runpri >= minrunpri; —runpri) {
        dq = &dispq[runpri];
        if (dq->dq_first == NULL)
            continue;
        DISPQ_CHECK(3,0);
        if(DISPQ_TRYLOCK(dq) == L_FAIL)
            continue;
        if( (pp = CheckDispQ(dq, runpri, NULL)) != NULL )
            DISPQ_UNLOCK (dq);
            goto out;
        }
        DISPQ_UNLOCK (dq);
        DISPQ_CHECK(4,0);
    }
    { int      node = NodeId;
      NodeInfo_t    *fni = ni;
    /*
     * steal from other Node queues before going idle
     */
    do {   /* be sure to include This Node's queue because
this search
              will search all the priorities, the first
search does not.
           */
```

APPENDIX-continued

```
        fni++;
        if( (node += 1) >= nnode ) {
            node =
            fni = NodeInfo;
        }
        if( fni->n_srunprocs >
affintune.StealNodeprocCount ||
            node == NodeId }
        for (runpri = fni->n_maxrunpri ; runpri >= fni-
>n_minrunpri
        --runpri) {
            dq = fni->n_dispq + runpri;
            if ((pp=dq->dq_first) == NULL)
                continue;
            DISPQ_CHECK(3,0);
            if(DISPQ_TRYLOCK(dq) == L_FAIL)
                continue;
            if( (pp = CheckDispQ (dq, runpri, fni)) !=
NULL) {
                DISPQ_UNLOCK (dq);
*if defined(AFFINITY_STATS)
                if( node != NodeId )
                    MyAffinInfo-
>affinstats.node_steals++;
#endif
                goto out;
            }
            DISPQ_UNLOCK(dq);
            DISPQ_CHECK(4,0);
        }
    } while( node != NodeId ) ;
}
```

Although the present invention has been described with particular reference to certain preferred embodiments thereof, variations and modifications of the present invention can be effected within the spirit and scope of the following claims.

What is claimed is:

1. A method of selecting a process to execute by a processor within a multi-processor computer system having groups of processors including the one processor arranged in nodes defined by node buses, comprising the steps of:

(a) providing a global run queue for queuing unaffined processes within the computer system by a scheduler;

(b) providing a nodal run queue for each node bus of the computer system for queuing affined processes within the computer system by the scheduler;

(c) ordering the unaffined processes in the global run queue in accordance with a predetermined priority scheme by an operating system within the computer system to form a global priority run queue;

(d) ordering the affined processes in each of the nodal run queues in accordance with a predetermined priority scheme by the operating system within the computer system to form a nodal priority run queue for each node bus;

(e) determining highest priority levels in the global priority run queue by the one processor in one of the nodes;

(f) determining highest priority levels in one of the nodal priority run queues by the one processor in the one node, wherein the one nodal priority run queue is associated with the one node;

(g) determining whether the highest priority level within the one nodal priority run queue is higher than the highest priority level within the global priority run queue;

(h) if the highest priority level within the one nodal priority run queue is lower than the highest priority level within the global priority run queue, then choosing a process within the global priority run queue to be the one process to execute by the one processor;

(i) if the highest priority level within the one nodal priority run queue is higher than the highest priority level within the global priority run queue, then determining whether there is an affined process in the highest priority level of the one nodal priority run queue;

(j) if the affined process exists in the highest priority level of the one nodal priority run queue, then choosing the affined process to be the one process to execute by the one processor;

(k) if the affined process does not exist in the highest priority level of the one nodal priority run queue, determining whether there is a process affined to a different processor in the node that is eligible to be run by the one processor;

(l) if the eligible process affined to a different processor in the node exists, choosing the eligible process affined to a different processor to be the one process to execute by the one processor; and (m) if the eligible process affined to a different processor in the node does not exist, choosing a process in a different nodal run queue to be the one process to execute by the one processor.

2. The method as recited in claim 1, wherein the predetermined priority scheme comprises a first in, first out (FIFO) priority scheme.

3. The method as recited in claim 1, wherein step (h) comprises the substep of:

(h-1) choosing an oldest process in the global priority run queue.

4. The method as recited in claim 1, wherein step (m) comprises the substep of:

(m-1) choosing a first process found by the one processor to be eligible to be run.

* * * * *